(12) United States Patent
Cox

(10) Patent No.: US 6,840,001 B1
(45) Date of Patent: Jan. 11, 2005

(54) SPINNER TYPE BAIT WITH A MOVABLE FISH HOOK IN A RATTLING CHAMBER

(76) Inventor: Dow McMillian Cox, 128 Helvey La., Jonesborough, TN (US) 37659

( * ) Notice: Subject to any disclaimer, the term of this patent is extended or adjusted under 35 U.S.C. 154(b) by 0 days.

(21) Appl. No.: 10/430,135

(22) Filed: May 6, 2003

(51) Int. Cl.$^7$ .............................................. A01K 85/01
(52) U.S. Cl. ..................................... 43/42.31; 43/42.19
(58) Field of Search ........................... 43/42.16, 42.19, 43/42.13, 42.31, 42.11

(56) References Cited

U.S. PATENT DOCUMENTS

| | | | | |
|---|---|---|---|---|
| 2,518,031 A | * | 8/1950 | Lane | 43/42.2 |
| 2,549,458 A | * | 4/1951 | Grimm | 43/42.13 |
| 2,617,226 A | * | 11/1952 | Tadaichi | 43/42.11 |
| 3,908,298 A | * | 9/1975 | Strader | 43/42.05 |
| 4,038,773 A | * | 8/1977 | Castelletti et al. | 43/26.2 |
| 4,747,228 A | * | 5/1988 | Giovengo, Jr. | 43/42.31 |
| 4,965,956 A | * | 10/1990 | Bethel | 43/43.1 |
| 5,182,876 A | | 2/1993 | Lewis | |
| 5,201,784 A | * | 4/1993 | McWilliams | 43/42.31 |
| 5,566,497 A | | 10/1996 | Oesterreich | |
| 5,887,379 A | * | 3/1999 | Lockhart | 43/42.13 |
| 6,082,039 A | | 7/2000 | McGuinness | |

* cited by examiner

Primary Examiner—Peter M. Poon
Assistant Examiner—David Parsley

(57) ABSTRACT

The improved spinner bait and buzz bait, having a moveable hook within a rattling chamber, has a head and a shaft, extending from the head, which is capable of engaging a fishing line. Additionally, the shaft can connect to a frame having other apparatus, such as a spinner connected with a swivel or a blade, which are utilized to attract fish. The shaft continues into the head where the curved end of the shaft enters the hole on the bottom of the rattling chamber, continues through the center of the eye of the hook, and exits the upper hole of the rattling chamber. A hook is hinged to the curved end of the shaft in the rattling chamber by the previously described connection enabling the movable hook to extend outwardly from the head.

1 Claim, 5 Drawing Sheets

SPINNER TYPE BAIT WITH A MOVABLE FISH HOOK IN A RATTLING CHAMBER

CROSS-REFERENCE TO RELATED APPLICATIONS

Not applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK SEQUENCE

Not Applicable

BACKGROUND OF THE INVENTION

The present invention relates generally to spinner baits and buzz baits and, more specifically, to such baits having a movable hook within the head that makes a clicking sound.

Lures resembling spinner baits and buzz baits, which attract fish by the use of a rotating member that produces sounds, splashing, or vibrational effects, have been popular and in the same general design for many years. Generally, spinner baits include a body comprising a single length of wire having a bend generally in the middle thereof. On one end of the wire is attached a hook, skirt, and lead weight and on the other end of the wire a spinner is attached thereto by means of a swivel. Likewise, the most common buzz baits are made on bent-wire form that resembles a "J" lying on its side, with the longer end of the shaft holding the molded head, skirt, and hook, and the upper, or shorter, arm supporting a spinning propeller blade.

There are multiple ways of making and dressing spinner baits and buzz baits. Important variables are wire design and choice of blade. New dressing materials and paints, the ever increasing selection of spinner blades, and the availability of inexpensive molds of good quality open up almost infinite possibilities for anglers.

However, despite these possibilities, spinner baits and buzz baits, generally still include a hook that extends rigidly from the head. Although the fixed connection of the hook to the head makes the lure weedless, it produces certain disadvantages. First, the rigid connection of the hook decreases the action and vibration, which attract fish. Secondly, the fixed hook can increase the chance that a fish will become unhooked because the fighting fish can use the spinner bait for leverage.

Thus, examples of lures having hooks, which are articulately mounted to the heads are described in U.S. patents issued to Lewis (U.S. Pat. No. 5,182,876) and Oesterreich (U.S. Pat. No. 5,566, 497). Articulately mounted hooks offer the angler superior recovery percentages because the fish, once hooked, cannot easily throw the hook by its resistive movements. The hook moves as the fish moves with respect to the head, thereby preventing the fish from gaining leverage against the head, tearing a larger hook penetration opening and slipping off the hook. Unfortunately, because these lures have hooks with unrestrictive articulated movement, the lures are nonweedless.

Hence, an example of a lure having a hook that has restrictive articulated movement is described in an U.S. patent issued to McGuiness, (U.S. Pat. No. 6,082,039). In this patent, a fishing lure is described that has a resilient, yet articulatable hook connector anchored within the head by spirally bound or braided filaments to operationally connect the hook to the head. However, because this fishing lure only flexes when the fish strikes the lure, it does not have any increased action and vibration to further attract fish.

Furthermore, none of the prior art examples possess an articulatable hook that produces an additional rattling sound. Thus, none of the prior art examples contain the unique combination of features defined by the present invention.

BRIEF SUMMARY OF THE INVENTION

In accordance with the present invention and in view of the foregoing disadvantages inherent in the known types of spinner baits now present in the prior art, the present invention provides an improved construction wherein the same can be utilized to provide a rattling and enhanced hook mechanism in the bait. As such, one object of the present invention, which will be described subsequently in greater detail, is to provide new and improved spinner bait and buzz baits, which have all the advantages of the prior art devices and none of the disadvantages.

Another object of the present invention is to provide a fishing lure having a hook connector with restricted articulatable movement, which is weedless.

Another object of the present invention is to provide improved spinner baits and buzz baits with increased vibration and action in the water for better attraction of fish.

It is another object of the present invention to provide a hook connector that moves with a fish when hooked, thereby preventing the fish from gaining leverage.

Still, it is another object of the present invention to provide a method of manufacturing spinner and buzz baits that have an articulatable hook connector.

Another object of the present invention is to further attract fish by providing spinner baits and buzz baits with an articulatable hook that strikes a rattling chamber to produce an additional noise when retrieved through the water.

Finally, it is an object of the invention to provide improved spinner baits and buzz baits which are simple and rugged in construction, economical to manufacture and efficient in operation.

This invention accomplishes the above and other objectives and it also overcomes the disadvantages of the prior art by providing a fishing lure having an articulatable hook connector that is simple in design and construction, inexpensive to fabricate, and easy to use. It is particularly well suited for use with either spinner baits or buzz baits. The spinner bait or buzz bait lure provided by the present invention comprises:

a head member, a tubular rattling chamber made of metal comprising an interior wall, a first end and a second end opposite said first end along a longitudinal axis of said rattling chamber, said rattling chamber mounted in said head member, a V-shaped shaft having a first end and a second end, said first end of said shaft extending into said head member and into said first end of said rattling chamber, said first end of said shaft comprising a curved connector portion, said shaft curved connector portion extending through the first end of said rattling chamber, said shaft adapted for connection to a fishing line along a mid-section of said shaft, a spinner blade attached to said second end of said shaft, said spinner blade spaced above said head member and said rattling chamber, a fishing hook having a pointed end and a portion disposed inside said rattling chamber, said hook portion disposed inside said rattling chamber directly connected to said curved connector portion of said first end of said shaft, wherein as said spinner bait or buzz bait is moved through water, said spinner blade is adapted to move and thereby cause vibrations in said V-shaped shaft, said vibrations being transmitted through said shaft via said curved connector portion to said hook causing movement of said hook inside said rattling chamber, thereby said hook is adapted to strike the interior wall of said rattling chamber to produce a noise, and wherein said rattling chamber is adapted to limit the horizontal alignment of said hook inside said rattling chamber so that the position of said pointed end of said hook is maintained above said rattling chamber as said spinner bait or buzz bait is moved through water. The fishing lure has a head member, a V-shaped shaft extending from the head member to engage a fishing line in the midsection, and a moveable hook that is hinged or mounted in a tubular rattle chamber. The tubular rattle chamber is a piece of metal tubing with a first end and a second end that is flared on the second end. After the hook is inserted from the flared end, the tubular rattling chamber is flattened on the first end and a hole is drilled through both sides of the tubing and the center of the hook's eye. The V-shaped shaft with a curved connector portion on one end of the shaft is then inserted through the tubing holes and the center of the hook's eye. The components can then be placed in a mold and a metal head member cast around the tubular rattling chamber. The shape of the rattling chamber accomplishes several things. The distance that the tubing is flattened limits the horizontal alignment of the hook so that the position of the pointed end of the hook is maintained above the rattling chamber, making the bait weedless as it is moved through water. In addition, the movement of the hook caused by the vibration of the spinner blade turning being transmitted through the shaft via the curved connector causes the hook to strike the interior wall of the tubular rattling chamber producing both a unique noise and increased action and vibration, which are attractive to fish. Finally, since the hook has restricted mobility when a fish is hooked, this prevents the fish from gaining leverage and subsequently becoming unhooked.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems, for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing preferred embodiments of the invention.

DETAILED DESCRIPTION OF THE DRAWINGS

The invention will be better understood and the above objects as well as objects other than those set forth above will become apparent when consideration is given to the following detailed description thereof. Such a description makes reference to the annexed drawings wherein.

Figure 1:
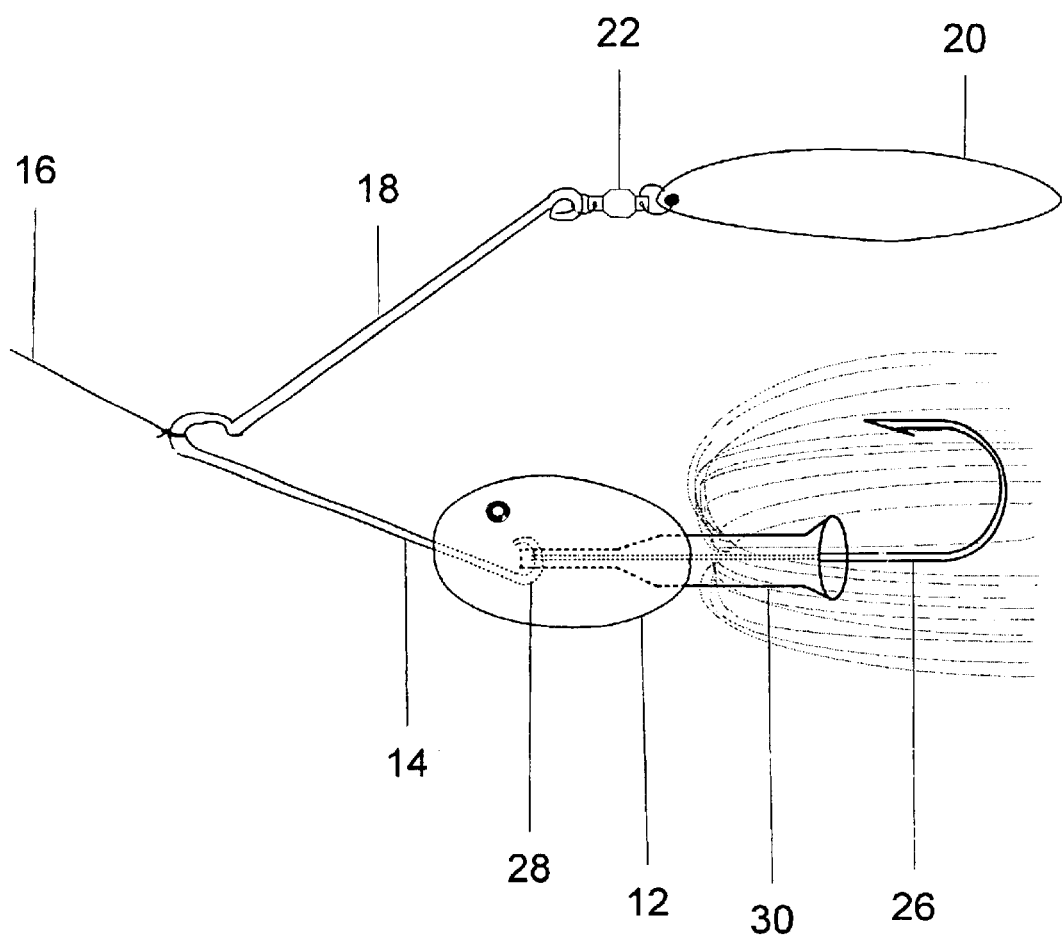
FIG. 1 is a perspective view of a fishing lure, having a moveable hook connector mounted within a rattling chamber, made in accordance with the present invention.

The reference numbers in the drawing relate to the following:

12=head
14=shaft
16=fishing line
18=frame
20=blade
22=swivel
24=hook connection within rattling chamber
26=hook
28=curved end of shaft
30=rattling chamber
32=allowed hook travel
34=drilled hole in rattle chamber For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings is a perspective view illustrating a fishing lure made in accordance with the present invention.

With additional reference to FIG. 1, the spinner balt or buzz bait fishing lure has a head 12, and a shaft 14, extending from the head 12 which is capable of engaging a fishing line 16. Additionally, the shaft 14 can connect to a frame 18 which together constitute the aforesaid V-shaped shaft, having a first end, the shaft, and a second end, the frame, the frame or second end of the V-shaped shaft having other apparatus, such as a spinner 20, connected with a swivel 22 or a blade (not shown), which are utilized to attract fish (not shown). The shaft 14 or first end of the V-shaped shaft continues into the head where the curved end of the shaft 28 enters the drilled hole on the bottom of the first end of the rattling chamber 30, continues through the center of the eye of the hook 26, and exits the upper hole of the first end of the rattling chamber 30. A hook 26 is directly connected to the curved end of the shaft 28 in the rattling chamber 30 by the previous described connection enabling the movable hook to extend outwardly from the head 12.

Figure 2A:
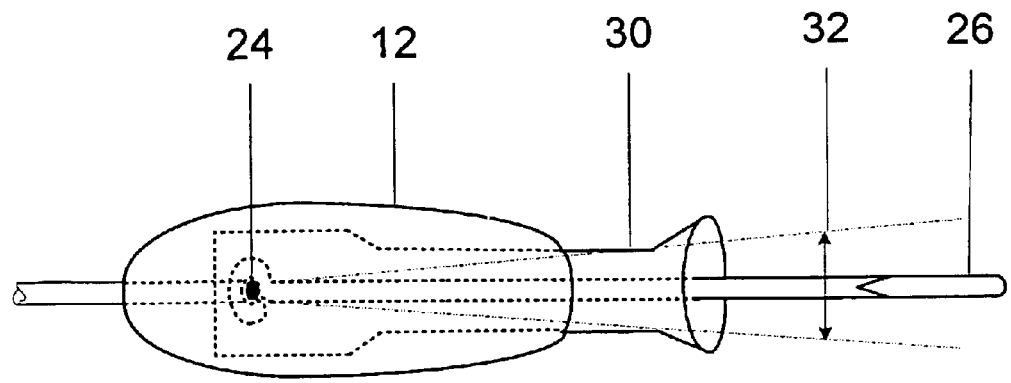
FIG. 2A is a top elevation view of the fishing lure of FIG. 1, indicating the restricted side-to-side movement of the hook.
Figure 2B:
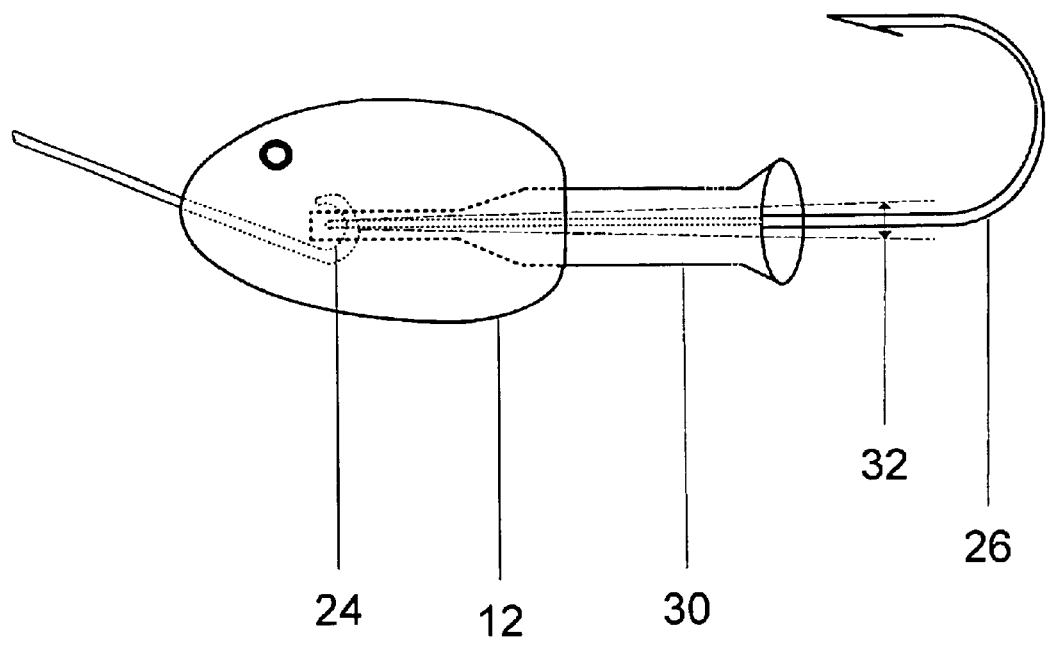
FIG. 2B is a side elevation view of the fishing lure FIG. 1, indicating the restricted up-and-down movement of the hook.

In reference to FIG. 2A and FIG. 2B, the allowed hook travel 32 permitted by the hook connection 24, as well as the shape of the rattling chamber 30, accomplish several things. First, the distance that the rattling chamber 30 is flattened prevents the hook 26 from rolling out of alignment with the head 12 and makes the bait weedless. Secondly, the movement of the hook 26 caused by the vibration of the blade turning causes the hook to tick the rattling chamber 30 producing both a unique noise and increased action and vibration. And finally, since the hook 26 has restricted mobility when a fish is hooked, this prevents the fish from gaining leverage and subsequently, becoming unhooked.

Figure 3A:
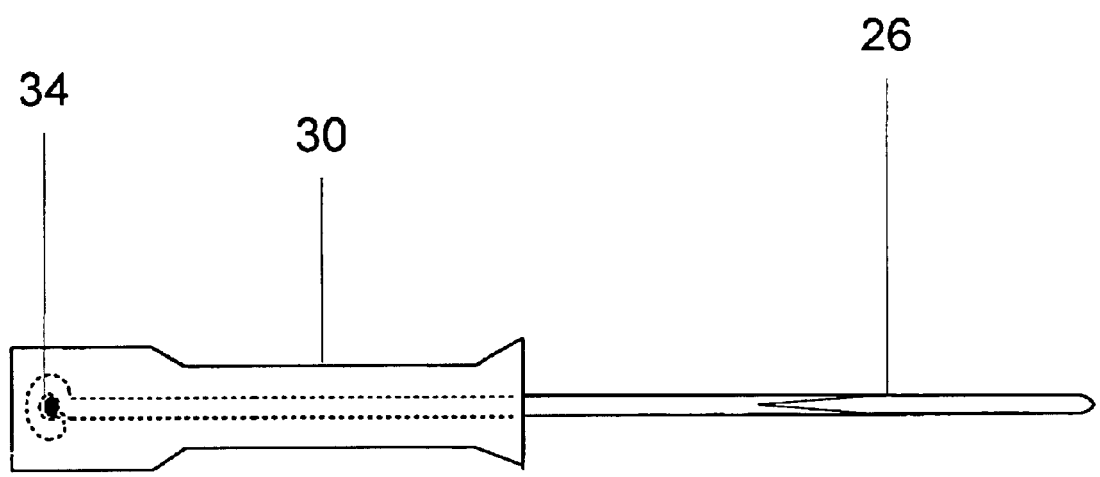
FIG. 3A is a top view of the tubing with the hook inserted, showing its approximate shape and the location of the hole drilled through the tubing.
Figure 3B:
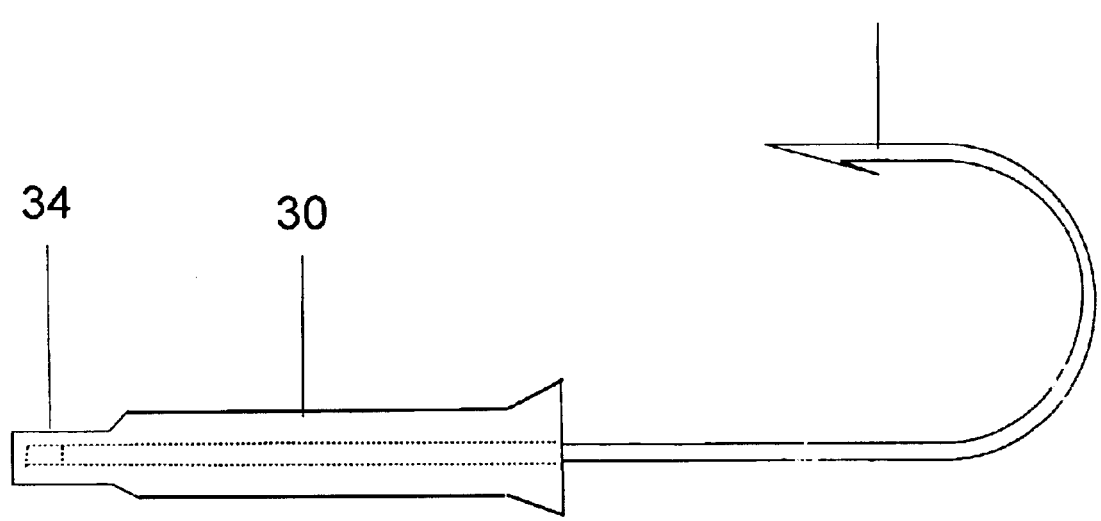
FIG. 3B is a side view of the tubing with the hook inserted showing its approximate shape and the location of the hole drilled through the tubing.

Instructions to assemble a spinner type bait with a moveable hook 26 in a rattle chamber 30 are as follows. Thus, in reference to FIG. 3A and FIG. 3B a tubing size should be selected that has an inside diameter larger that the outside diameter of the eye of the hook. The tubing should be cut to the approximate length depending on the size of the bait. Once the tubing is cut, one end will need to flared at a 45 degree angle using a flaring tool. Now, the eye of the hook can be inserted into the flared end of the tubing until the forward part of the hook is flush with the opposite end from the flare. After the insertion of the hook, the opposite end from the flare can be flattened down to the top of and slightly past the end of the hook's eye. With the hook 26 positioned slightly inset from the flattened end, a hole 34 slightly larger than the shaft diameter should be drilled into the upper side of the tubing, through the center of the hook's eye, and out the other side of the tubing.

Figure 4:
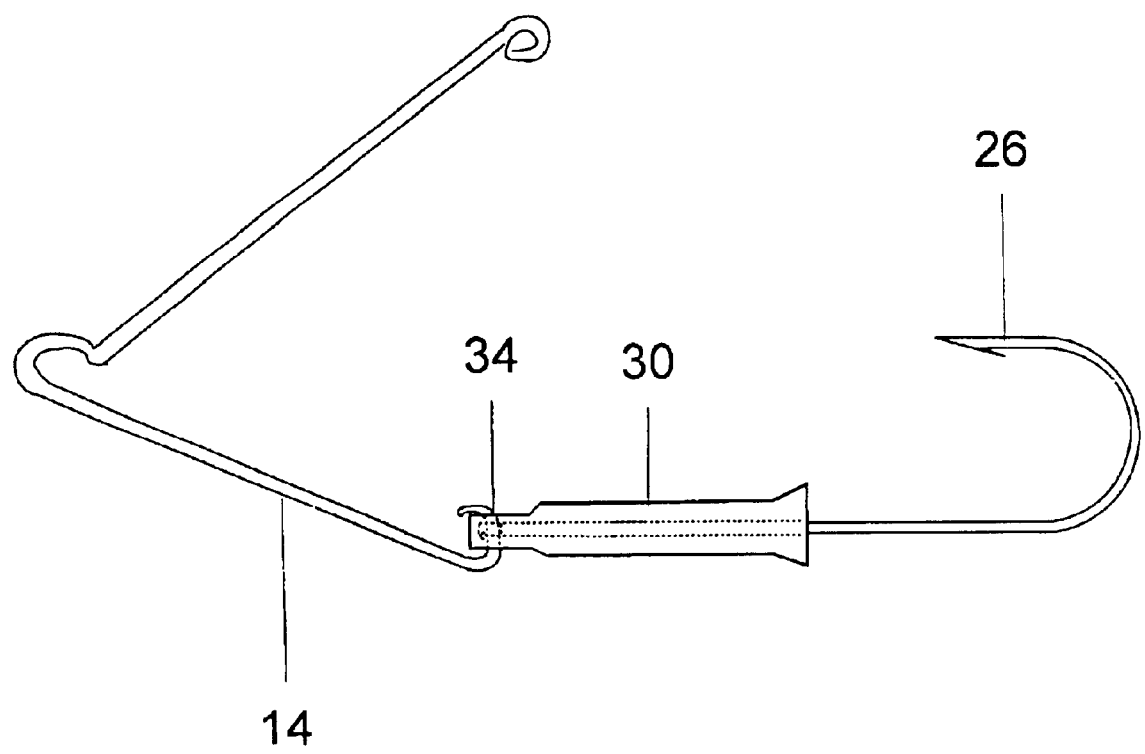
FIG. 4 is a side view of the connection of the shaft to the rattle chamber and the hook before being placed in a mold and having the head cast around the assembly.
Figure 5:
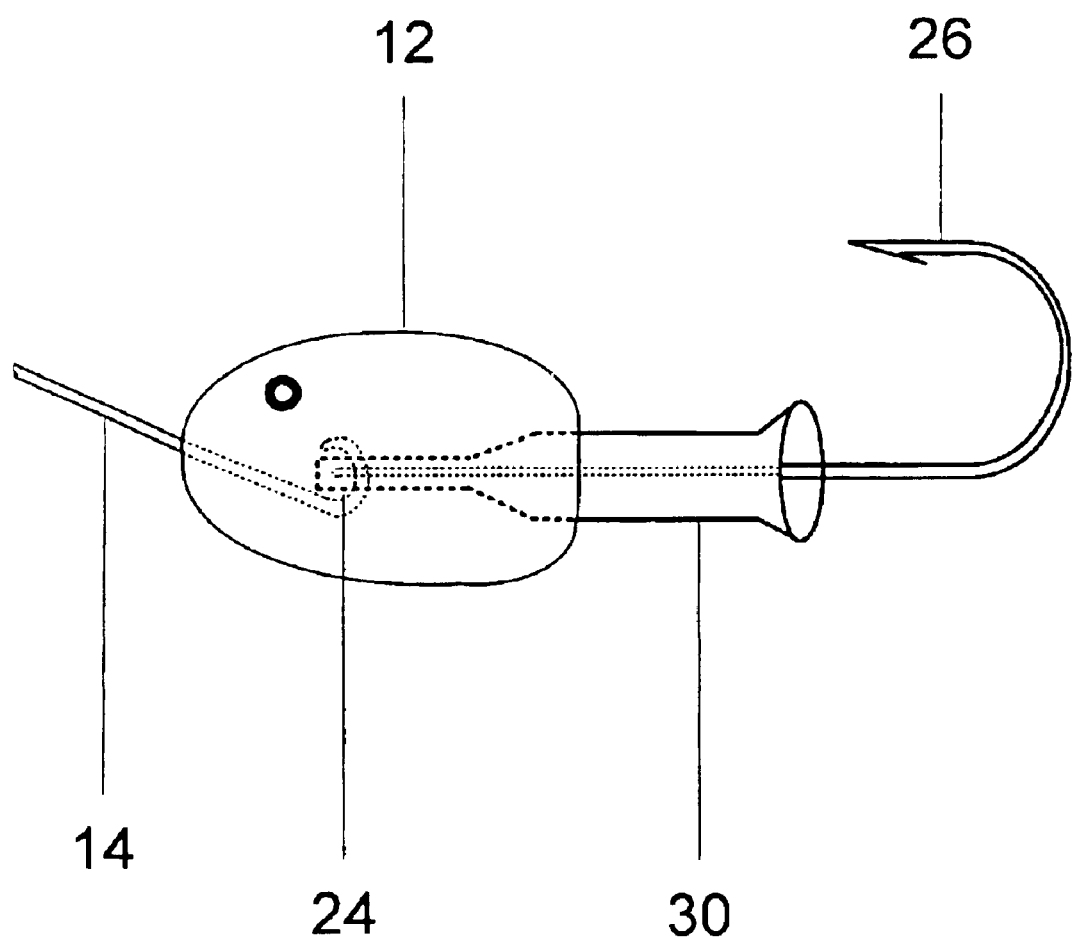
FIG. 5 is a partial side view of one embodiment of the hook connector within the molded head.

As shown in FIG. 4, the wire shaft 14 having a loop on one end can be started in the bottom side of the drilled hole of the rattling chamber 34, which is located in the rattling chamber 30 opposite the side of the point of the hook 26, then inserted through the center of the hook's eye, and out the upper side of the rattling chamber 30. Subsequently, the assembly, shown in FIG. 4 can be placed in a mold, and lead or other casting material can be used to form a head around the rattling hook assembly as shown in FIG. 5. After molding the head around the hook connection in the rattling chamber 24, the head 12 may be colored; eyes may be added, and skirt material may be placed in front of the flared tubing for appearance. In addition, the opposite end of the wire frame can have any combination of blades attached.

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What I claim as my invention is:

1. A spinner bait or buzz bait lure comprising, a head member, a tubular rattling chamber made of metal comprising an interior wall, a first end and a second end opposite said first end along a longitudinal axis of said rattling chamber, said rattling chamber mounted in said head member, a V-shaped shaft having a first end and a second end, said first end of said shaft extending into said head member and into said first end of said rattling chamber, said first end of said shaft comprising a curved connector portion, said shaft curved connector portion extending through the first end of said rattling chamber, said shaft adapted for connection to a fishing line along a midsection of said shaft, a spinner blade attached to said second end of said shaft, said spinner blade spaced above said head member and said rattling chamber, a fishing hook having a pointed end and a portion disposed inside said rattling chamber, said hook portion disposed inside said rattling chamber directly connected to said curved connector portion of said first end of said shaft, wherein as said spinner bait or buzz bait is moved through water, said spinner blade is adapted to move and thereby cause vibrations in said V-shaped shaft, said vibrations being transmitted through said shaft via said curved connector portion to said hook causing movement of said hook inside said rattling chamber, thereby said hook is adapted to strike the interior wall of said rattling chamber to produce a noise, wherein said rattling chamber is adapted to limit the horizontal alignment of said hook inside said rattling chamber so that the position of said pointed end of said hook is maintained above said rattling chamber as said spinner bait or buzz bait is moved through water.

\* \* \* \* \*